(12) United States Patent
Osypov et al.

(10) Patent No.: US 9,103,933 B2
(45) Date of Patent: Aug. 11, 2015

(54) ESTIMATING A PROPERTY BY ASSIMILATING PRIOR INFORMATION AND SURVEY DATA

(75) Inventors: Konstantin S. Osypov, Houston, TX (US); Ran Bachrach, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 572 days.

(21) Appl. No.: 13/461,917

(22) Filed: May 2, 2012

(65) Prior Publication Data

US 2012/0281501 A1 Nov. 8, 2012

Related U.S. Application Data

(60) Provisional application No. 61/483,272, filed on May 6, 2011.

(51) Int. Cl.
- G01V 1/00 (2006.01)
- G01V 1/30 (2006.01)
- G01V 3/38 (2006.01)

(52) U.S. Cl.
CPC . G01V 1/306 (2013.01); G01V 3/38 (2013.01)

(58) Field of Classification Search
CPC ..................................................... G01V 1/306
USPC .............................................. 367/73; 702/14
See application file for complete search history.

(56) References Cited

U.S. PATENT DOCUMENTS

| 6,826,486 | B1 | 11/2004 | Malinverno |
| 7,373,251 | B2 * | 5/2008 | Hamman et al. ................ 702/14 |
| 7,620,534 | B2 * | 11/2009 | Pita et al. ........................ 703/10 |
| 2001/0044698 | A1 | 11/2001 | Kim |
| 2009/0184958 | A1 | 7/2009 | Osypov et al. |
| 2011/0098996 | A1 | 4/2011 | Nichols et al. |
| 2011/0231164 | A1 | 9/2011 | Zhang et al. |
| 2011/0292766 | A1 | 12/2011 | Bachrach |

FOREIGN PATENT DOCUMENTS

| EP | 0750203 A2 | 12/1996 |
| RU | 2206911 C2 | 6/2003 |
| RU | 2223521 C2 | 2/2004 |
| WO | 9928767 A1 | 6/1999 |
| WO | 2011077300 A2 | 6/2011 |

OTHER PUBLICATIONS

International Search Report and Written Opinion of PCT Application No. PCT/US2012/036216 dated Jul. 26, 2012: pp. 1-6.
Li et al., "Anisotropic Tomography Using Rock Physics Constraints," 73rd EAGE Conference & Exhibition, May 2011: pp. 1-5.

* cited by examiner

*Primary Examiner* — Mark Hellner
(74) *Attorney, Agent, or Firm* — Abimbola Bukoye

(57) ABSTRACT

Prior information describing a distribution of values of a parameter relating to physical characteristic of a target structure is received. Acquired survey data of the target structure is received. Using a probabilistic technique, the prior information and the survey data is assimilated to produce an estimated property of the target structure.

22 Claims, 3 Drawing Sheets

ESTIMATING A PROPERTY BY ASSIMILATING PRIOR INFORMATION AND SURVEY DATA

CROSS REFERENCE TO RELATED APPLICATION

This application claims benefit under 35 U.S.C. §119(e) of U.S. Provisional Patent Application Ser. No. 61/483,272 filed May 6, 2011, which is hereby incorporated by reference in its entirety.

BACKGROUND

Various techniques (e.g., electromagnetic or seismic techniques) exist to perform surveys of subterranean structures for identifying subterranean elements of interest. Examples of subterranean elements of interest include hydrocarbon bearing reservoirs, gas injection zones, thin carbonate or salt layers, and fresh water aquifers. One type of electromagnetic (EM) survey technique is the controlled source electromagnetic (CSEM) survey technique, in which an electromagnetic transmitter, called a "source," is used to generate electromagnetic signals. Surveying units, called "receivers," are deployed within an area of interest to make measurements from which information about the subterranean structure can be derived. The receivers may include a number of sensing elements for detecting any combination of electric fields, electric currents, and/or magnetic fields.

A seismic survey technique uses a seismic source, such as an air gun, a vibrator, or an explosive to generate seismic waves. The seismic waves are propagated into the subterranean structure, with a portion of the seismic waves reflected back to the surface (earth surface, sea floor, sea surface, or wellbore surface) for receipt by seismic receivers (e.g., geophones, hydrophones, etc.).

Measurement data (e.g., seismic measurement data and/or EM measurement data) can be analyzed to develop an output that represents a subterranean structure, where the output can include an image of the subterranean structure, a model of the subterranean structure, and so forth.

SUMMARY

In general, according to some implementations, prior information describing a distribution of values of a parameter relating to a physical characteristic of a target structure is received, where the prior information includes a rock physics probability structure. Acquired survey data of the target structure is received. Using a probabilistic technique, the prior information and the survey data are assimilated to produce an estimated property of the target structure.

In general, according to alternative implementations, geological information relating to a subterranean structure is received. A geological probability structure is computed based on the geological information. The geological probability structure is used in a workflow for estimating at least one property of the subterranean structure, where the at least one property is for providing an output representing the subterranean structure.

In general, according to further implementations, a system includes at least one processor to receive prior information describing a distribution of values of a parameter relating to a physical characteristic of a target structure, where the prior information includes a rock physics probability structure, and receive acquired survey data of the target structure. The at least one processor is to further assimilate, using a probabilistic technique, the prior information and the survey data, to produce an estimated property of the target structure.

In further or alternative implementations, the prior information includes at least another structure selected from the group consisting of a geological probability structure and a seismic probability structure.

In further or alternative implementations, the acquired survey data is obtained using at least one technique selected from the group consisting of a surface survey operation and a well survey operation.

In further or alternative implementations, the rock physics probabilistic structure describes a probability distribution of values of a rock model parameter.

In further or alternative implementations, input information relating to the target structure is received, and an interpretation technique is used to produce the probability distribution from the input information.

In further or alternative implementations, the assimilating includes performing uncertainty analysis using the prior information and the survey data.

In further or alternative implementations, the assimilating is iteratively performed until a stopping criterion is satisfied, where the stopping criterion relates to whether a target spatial scaling has been achieved.

In further or alternative implementations, images are generated based on models of the target structure, where the images are used in the assimilating. The models are updated using the estimated at least one property.

In further or alternative implementations, a range of a rock model parameter is estimated, and plural realizations of values of the rock model parameter are generated based on the estimated range and using at least one rock model. The rock physics probability structure is generated based on the plural realizations.

In further or alternative implementations, the geological information includes geological interpretations computed based on images of the subterranean structure.

In further or alternative implementations, the geological interpretations are generated based on applying different interpretation techniques to the images.

In further or alternative implementations, the images are generated based on different models of the subterranean structure.

In further or alternative implementations, the geological probability structure is based on performing geostatistical analysis on information associated with the geological interpretations.

In further or alternative implementations, using the geological probability structure includes performing uncertainty analysis based on the geological probability structure.

In further or alternative implementations, performing the uncertainty analysis further considers a second probability structure derived from rock physics modeling.

In further or alternative implementations, the second probability structure represents a probability distribution relating to rock model parameters.

In further or alternative implementations, performing the uncertainty analysis further considers a second probability structure derived from seismic gathers.

Other or additional features will be apparent from the following description, from the drawings, and from the claims. The summary is provided to introduce a selection of concepts that are further described below in the detailed description. The summary is not to be intended to be used as an aid in limiting the scope of the claimed subject matter.

BRIEF DESCRIPTION OF THE DRAWINGS

Some embodiments are described with respect to the following figures.

DETAILED DESCRIPTION

Figure 1:
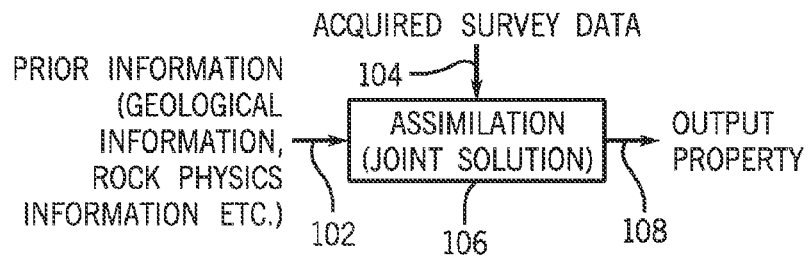
FIG. 1 is a schematic diagram of assimilation of various input information to produce an output, in accordance with some embodiments.

In the ensuing discussion, reference is made to use of seismic survey data, which is survey data collected using seismic survey equipment including seismic sources and seismic receivers. However, note that in other implementations, EM survey data or other types of survey data can be used. The survey data can be collected using survey equipment (including survey sources and receivers) provided at an earth surface above a subterranean structure, and/or in one or more wellbores drilled into the subterranean structure.

Also, in the ensuing discussion, reference is made to techniques or mechanisms applied with respect to subterranean structures. However, techniques or mechanisms according to some implementations can also be applied with respect to other target structures that are the subject of a survey, such as human tissue, mechanical structures, and so forth.

In accordance with some embodiments, techniques or mechanisms are provided to assimilate "prior information" with acquired survey data (acquired using survey equipment) to estimate at least one property of a subterranean structure. Examples of different types of "prior information" include different types of probability structures, including a geological probability structure, a rock physics probability structure, and a seismic probability structure (discussed in detail further below). More generally, in some implementations, the prior information can include information describing a distribution of values of a parameter (or multiple parameters) that relate to physical characteristics of the subterranean structure.

In some implementations, assimilating prior information with acquired survey data can refer to performing a joint solution to produce at least one property of a subterranean structure that is consistent with the prior information and the acquired survey data. The joint solution is based on use of probabilistic techniques that considers the probabilistic information contained in the prior information, such as the geological probability structure, rock physics probability structure, and seismic probability structure.

In some implementations, a geological probability structure represents a probability distribution (distribution of probabilities at discrete geometric points) corresponding to geological parameters relating to a subterranean structure. Geological parameters can include parameters indicating the lithology or facies of the subterranean structure. The lithology describes physical characteristics associated with different types of materials (e.g., different rock types) in the subterranean structure. As other examples, the lithology can describe the grain sizes of rocks in the subterranean structure, as well as the mineralogy of the different rocks. Facies refers to a body of rock that forms under certain conditions of sedimentation, reflecting a particular depositional process or environment. In some examples, the geological probability structure can be in the form of a geological probability density function (PDF). Details of forming a geological probability structure according to some examples are described in U.S. Ser. No. 12/837,936 filed Jul. 16, 2010, U.S. Patent Pub. No. 2011/0231164, which is hereby incorporated by reference.

In some implementations, a rock physics probability structure (which in some examples can be a rock physics probability density function) represents a probability distribution of rock model parameters associated with the subterranean structure. Examples of rock model parameters include porosity, velocity, resistivity, compaction, and so forth. The probability distribution can include probabilities at different geometric points, and each probability can represent a probability that a particular rock model parameter has a given value or range of values at the respective geometric point. The rock physics probability structure also represents a probability distribution relating to anisotropic parameters.

In some implementations, a seismic probability structure represents a probability distribution (e.g., probability density function) of parameters relating to seismic gathers. Seismic gathers are created based on performing migration on seismic survey data. In an example, the probabilities in the seismic probability distribution represent likelihoods that a given gather is flat. A gather refers to a representation of traces (e.g., seismic traces) that share an acquisition parameter, such as a common image point gather, which contains traces having a common image point. A gather can be formed in a different domain and can have one or more dimensions (e.g., offset gathers, receiver gathers, angle and dip gathers, and so forth)

FIG. 1 is a schematic diagram of an example workflow according to some implementations. Prior information (102), including geological information (e.g., the geological probability structure discussed above), rock physics information (e.g., rock physics probability structure discussed above), seismic parameter information (e.g., seismic probability structure discussed above), and/or other information is received by an assimilation module 106. The assimilation module 106 also receives acquired survey data 104, which can include acquired seismic data and/or EM data, as examples. The acquired survey data can include surface survey data (acquired in a surface survey operation involving survey equipment placed on an earth surface above a subterranean structure) and/or well data (acquired in a well survey operation involving survey equipment placed in a wellbore).

The assimilation module 106 can perform a joint solution on the prior information 102 and the acquired survey data 104, to produce an estimated output property (108), or multiple estimated output properties, of the subterranean structure. The estimated output property (or estimated output properties) is (are) consistent with both the prior information 102 and the acquired survey data 104. The estimated output property (or properties) can be used for various purposes, such as for use in generating an image of the subterranean structure, for use in creating (or updating) a model of the subterranean structure, and so forth.

As noted above, due to the prior information containing probabilistic information such as a geological probability structure, a rock physics probability structure, and/or a seismic probability structure, the joint solution to produce the estimated output property (or properties) of the subterranean structure involves use of a probabilistic technique. Examples of probabilistic techniques include stochastic simulation, stochastic approximation, and so forth. As discussed further below, a probabilistic technique for assimilating the prior information and acquired survey data can include use of uncertainty analysis. Further details regarding the assimilation of the prior information 102 and acquired survey data 104 are provided below in connection with FIG. 3.

Figure 2:
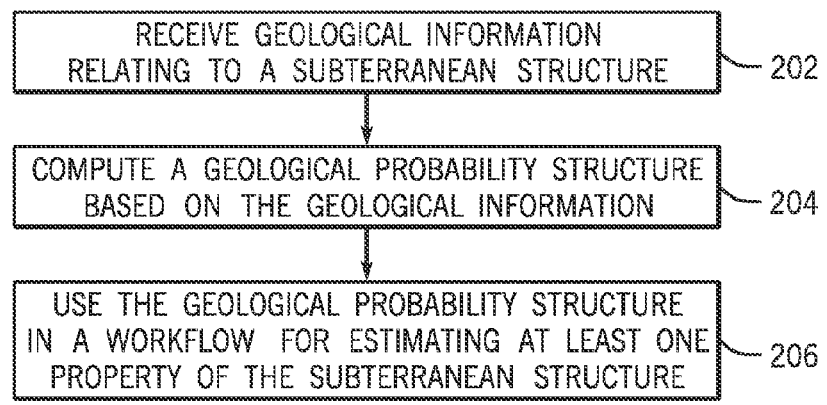
FIGS. 2 and 3 are flow diagrams of processes according to various embodiments.

FIG. 2 is a flow diagram of a process according to further implementations. The process receives (at 202) geological information relating to a subterranean structure. As discussed further below, such geological information can be in the form of multiple geological interpretations that are based on images derived from different velocity models. A velocity model refers to a model containing velocities at different points in a volume representing the subterranean structure. A velocity model can be an anisotropic velocity model, in which case the model has velocities that can vary as a function of direction.

The process of FIG. 2 further computes (at 204) a geological probability structure based on the received geological information (e.g., the multiple geological interpretations). The geological probability structure (along with other information such as the rock physics probability structure and the seismic probability structure) is used (at 206) in a workflow for estimating at least one property of the subterranean structure.

In some implementations, the workflow applied at 206 includes an uncertainty analysis workflow, which is part of the assimilation discussed further above. Uncertainty analysis can provide an understanding of the impact of uncertainty in estimates of a model or other output representing a subterranean structure and properties. For a given set of observed survey data collected in a survey operation with respect to a subterranean structure, there can be uncertainty in the true positions of events in subsurface images based on the survey data. These uncertainties can lead to exploration risk, drilling risk, and/or volumetric uncertainties (in which there is uncertainty in the estimated volume of subsurface fluids of interest, such as hydrocarbons). While the underlying ambiguity may not be fully eradicated, a quantified measure of uncertainties may provide deeper understanding of the risks and related mitigation plans to address the risks.

In some examples, the uncertainty analysis can quantify measures of uncertainties of estimated model parameters. The output of the uncertainty analysis includes a posterior probability function for initial (or prior) models. In some examples, the posterior probability function can be used to update the initial models to provide more refined models of the subterranean structure.

Figure 3:
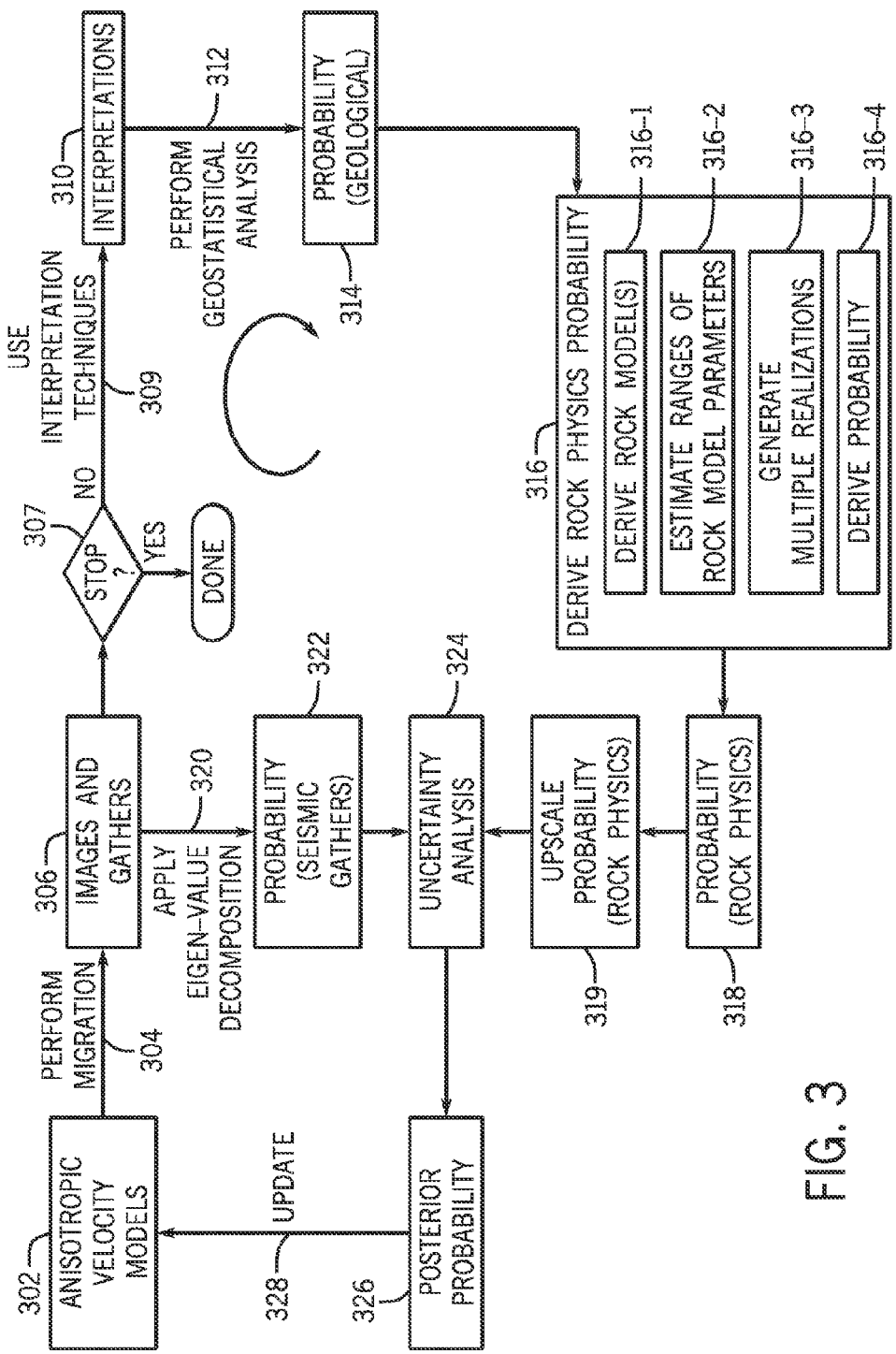

FIG. 3 is a flow diagram according to further implementations. As shown in FIG. 3, anisotropic velocity models (302), or other type of models, that relate to a subterranean structure under analysis are provided. In other implementations, other types of models can be employed. Migration is then performed (304) with respect to the anisotropic velocity models 202 to produce respective images and gathers (306) that represent the subterranean structure. Migration considers acquired survey data (such as 104 discussed above in connection with FIG. 1).

Next, based on the images or image gathers, the process determines (307) whether a stopping criterion is satisfied. As discussed further below, the stopping criterion is based on whether a target spatial scaling in the image gathers has been achieved. If the stopping criterion is satisfied, the process ends. However, if the stopping criterion is not satisfied, then the process continues. Note that the FIG. 3 process is an iterative process that can be iterated multiple times until the stopping criterion is satisfied, as determined at 307.

A spatial scale in an image refers to spacing between geometric points in the image. Initially, the scale used in the image can be relatively large, which can refer to the spatial distance between image points in the image gathers 306 being relatively large. If it is determined at 307 that the target spatial scaling has not been achieved, then the process continues and another iteration is performed.

Various different interpretation techniques can then be used (at 309) to produce one or more interpretations (310) for each of the images. Each interpretation includes a set of attributes for a respective image gather. Examples of different interpretation techniques that can be used include a horizon interpretation, an interpretation using an automated interpretation tool such as Charisma™ from Schlumberger, a lithocube interpretation, and a geological interpretation (e.g., extrema interpretation or a seismic DNA cube interpretation). Non-limiting examples of geological interpretations are provided in PCT Application No. PCT/IB2010/055574 filed Dec. 3, 2010, Pub. No. WO 2011/0077300 which is hereby incorporated by reference.

Another interpretation technique that can be used according to some examples is a basin modeling technique. In some examples, a basin modeling technique can refer to a technique used to analyze evolution of sedimentary basins in a subterranean structure, for evaluating content of the subterranean structure. Basin modeling can predict if, and how, a reservoir or other subterranean element has been charged with a target fluid (e.g., hydrocarbons), including the source and timing of fluid generation, migration routes, quantities, and fluid type in the subterranean structure. An example product that can perform basin modeling includes a PetroMod software product from Schlumberger. In other examples, other products can be used for performing basin modeling.

Next, geostatistical analysis is performed (312) on information associated with the interpretations 310. Non-limiting examples of geostatistical analysis are described in U.S. Patent Pub. No. 2011/0231164, referenced above. The application of the geostatistical analysis produces a geological probability structure 314.

The process of FIG. 3 further derives (316), from a rock model (or rock models), a rock physics probability structure 318. An input to the derivation task 316 is the geological probability structure 314. A rock model includes various parameters, such as porosity, velocity, resistivity, compaction, and/or others. The rock model contains information to model one or more of the foregoing parameters as a function of geometric location in the subterranean structure.

In some implementations, the derivation task 316 can include one or more sub-tasks. A first sub-task 316-1 derives a rock model (or rock models) from basic physical principles, such as by use of a stochastic rock physics modeling technique. Non-limiting exemplary techniques of deriving rock models are described in U.S. Ser. No. 13/098,589, entitled "Estimating Anisotropic Parameters," filed May 2, 2011, U.S. Patent Pub. No. 2011/0292766, which is hereby incorporated by reference.

The derivation task 316 can also include a sub-task 316-2 of estimating ranges of rock model parameters from log data analysis or prior knowledge. Non-limiting examples of estimating ranges of rock model parameters are discussed in U.S. U.S. Patent Pub. No. 2011/0292766, referenced above. The derivation task 316 can also generate (316-3) multiple realizations of rock model parameters using stochastic simulations by drawing from a prior probability (represented by the derived range at 316-2) and performing forward modeling (using the rock model(s) derived in sub-task 316-1).

A probability associated with the stochastic modeling can then be derived (316-4), based on the multiple realizations, to produce the rock physics probability structure 318, which contains probabilities associated with anisotropic parameters.

In some embodiments, upscaling is then applied (319) to the rock physics probability structure, which reduces the spatial scaling in the rock physics probability structure.

As further shown in FIG. 3, in some implementations, the process also applies eigen-value decomposition (320) on a tomography operator generated from the image gathers 306 (produced based on migration 304) to produce a seismic probability structure 322.

In some embodiments, the three probability structures, including the geological probability structure 314, rock physics probability structure 318, and seismic probability structure 322, can be input to and assimilated in an uncertainty analysis task 324 to perform uncertainty analysis. The output of the uncertainty analysis 324 can include a posterior probability structure, such as a posterior covariance matrix described in U.S. Patent Publication No. 2009/0184958, entitled "Updating a Model of a Subterranean Structure using Decomposition," filed Jan. 15, 2009, which is hereby incorporated by reference.

Generally, the posterior probability structure can be considered to include probabilistic information following analysis that has considered actual data, including the acquired survey data. A posterior probability structure is contrasted with a prior probability structure (also considered the prior information 102 of FIG. 1), such as the geological probability structure (314), rock physics probability structure (318), and seismic probability structure (322) discussed above. The posterior probability structure can be used to update (328) the anisotropic velocity models 302 (or other models).

In some implementations, the probability structures 314, 318, and 322 can also be combined (such as by computing a weighted sum of the structures) to generate a joint probability distribution structure based on geological information, rock physics information, and seismic gather information). The joint probabilistic distribution structure can be represented as P(G,R,S), where G represents geological information, R represents rock physics information, and S represents seismic gather information.

In some examples, the joint probability distribution structure P(G,R,S) can be converted into a form that allows a probability distribution structure of one of G, R, and S to be computed based on the probability distribution structures of the other two types, e.g., P(R|G,S), P(G|R,S), and P(S|R,G).

In some implementations, calibration can also be applied in the procedure of FIG. 3. For example, calibration can be applied to the interpretations 310. Alternatively or additionally, calibration can also be applied in one or more of the following tasks: geostatiscal analysis 312, rock physics probability structure derivation 316 and uncertainty analysis 324. Calibration can refer to correcting certain properties to improve accuracy. Calibration can be performed based on acquired well data, which can be well data acquired using a logging tool, well data acquired using a checkshot technique (which involves vertical seismic profiling, where one or more seismic sources are placed at the earth surface, and seismic receivers are placed in a wellbore), or well data acquired using another technique. Non-limiting example calibration techniques are described in U.S. Patent Publication No. 2011/0098996, entitled "Sifting Models of a Subsurface Structure," filed Oct. 18, 2010, which is hereby incorporated by reference.

Figure 4:
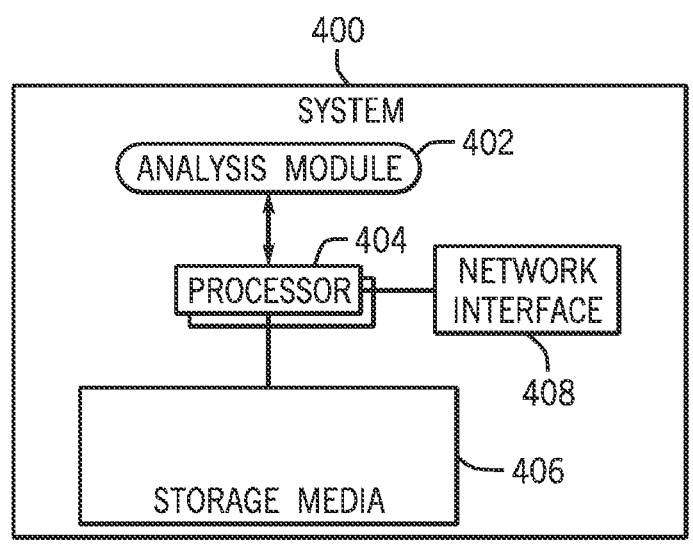
FIG. 4 is a block diagram of a system capable of incorporating some embodiments.

FIG. 4 depicts an example system according to some implementations. The system can be an individual computer system or an arrangement of distributed computer systems. The system includes an analysis module 402 that is executable to perform various tasks according to some embodiments, such as the tasks depicted in any FIGS. 1-3. The analysis module 402 is executable on one or multiple processors 404. A processor can include a microprocessor, microcontroller, processor module or subsystem, programmable integrated circuit, programmable gate array, or another control or computing device.

The processor(s) 404 is (are) connected to storage media 406. The processor(s) 404 is (are) also connected to a network interface 408 to allow the system 400 to communicate over a data network.

The storage media 406 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving prior information describing a distribution of values of a parameter relating to a physical characteristic of a target structure, where the prior information includes a rock physics probability structure, wherein the rock physics probabilistic structure describes a probability distribution of values of a rock model parameter;
receiving acquired survey data of the target structure; and
assimilating, using a probabilistic technique, the prior information and the survey data, to produce an estimated property of the target structure.

2. The method of claim 1, wherein receiving the prior information includes receiving at least another structure selected from the group consisting of a geological probability structure and a seismic probability structure.

3. The method of claim 1, wherein receiving the acquired survey data includes receiving the acquired survey data obtained using at least one technique selected from the group consisting of a surface survey operation and a well survey operation.

4. The method of claim 1, further comprising:
receiving input information relating to the target structure; and
using an interpretation technique to produce the probability distribution from the input information.

5. The method of claim 1, wherein assimilating the prior information and the survey data includes performing uncertainty analysis using the prior information and the survey data, the uncertainty analysis producing measures quantifying uncertainties in a model of the target structure.

6. The method of claim 1, wherein the assimilating is iteratively performed until a stopping criterion is satisfied, where the stopping criterion relates to whether a target spatial scaling has been achieved.

7. The method of claim 1, further comprising:
generating images based on models of the target structure, wherein the images are used in the assimilating; and
updating the models using the estimated at least one property.

8. The method of claim 1, further comprising:
estimating a range of a rock model parameter;
generating plural realizations of values of the rock model parameter based on the estimated range and using at least one rock model; and
generating probabilities in the probability distribution of the rock physics probability structure based on the plural realizations.

9. A method comprising:
receiving geological information relating to a subterranean structure;
computing a geological probability structure based on the geological information, the geological probability structure including a probability distribution of probabilities of values of a geological parameter; and
using the geological probability structure in a workflow for estimating at least one property of the subterranean structure, wherein the at least one property is for providing an output representing the subterranean structure.

10. The method of claim 9, wherein receiving the geological information comprises receiving geological interpretations computed based on images of the subterranean structure.

11. The method of claim 10, further comprising generating the geological interpretations based on applying different interpretation techniques to the images.

12. The method of claim 11, further comprising generating the images based on different models of the subterranean structure.

13. The method of claim 10, wherein computing the geological probability structure is based on performing geostatistical analysis on information associated with the geological interpretations.

14. The method of claim 9, wherein using the geological probability structure comprises performing uncertainty analysis based on the geological probability structure.

15. The method of claim 14, wherein performing the uncertainty analysis further considers a second probability structure derived from rock physics modeling.

16. The method of claim 15, wherein the second probability structure represents a probability distribution including probabilities of values of rock model parameters.

17. The method of claim 14, wherein performing the uncertainty analysis further considers a second probability structure derived from seismic gathers.

18. A system comprising:
at least one processor to:
receive prior information describing a distribution of values of a parameter relating to a physical characteristic of a target structure, where the prior information includes a rock physics probability structure including a probability distribution of probabilities of values of a rock model parameter;
receive acquired survey data of the target structure; and
assimilate, using a probabilistic technique, the prior information and the survey data, to produce an estimated property of the target structure.

19. The system of claim 18, wherein the prior information further includes at least another structure selected from the group consisting of a geological probability structure and a seismic probability structure.

20. The method of claim 1, wherein the probability distribution includes probabilities for respective geometric points in the target structure, and wherein a given probability of the probabilities is a probability that the rock model parameter has a given value or a given range of values at a corresponding geometric point of the geometric points.

21. The method of claim 9, wherein the probabilities of the probability distribution are for respective geometric points in the subterranean structure, and wherein a given probability of the probabilities is a probability that the geological parameter has a given value or a given range of values at a corresponding geometric point of the geometric points.

22. The system of claim 18, wherein the probabilities of the probability distribution are for respective geometric points in the target structure, and wherein a given probability of the probabilities is a probability that the rock model parameter has a given value or a given range of values at a corresponding geometric point of the geometric points.

* * * * *